(12) United States Patent
Asai

(10) Patent No.: US 7,843,310 B2
(45) Date of Patent: Nov. 30, 2010

(54) POWER MANAGEMENT SYSTEMS, METHODS, AND PROGRAMS FOR IN-VEHICLE DEVICES

(75) Inventor: Hiroyuki Asai, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 888 days.

(21) Appl. No.: 11/652,025

(22) Filed: Jan. 11, 2007

(65) Prior Publication Data

US 2007/0176731 A1 Aug. 2, 2007

(30) Foreign Application Priority Data

Jan. 13, 2006 (JP) ............................. 2006-006527

(51) Int. Cl.
    *G05B 23/02* (2006.01)
    *G05B 23/00* (2006.01)
    *G05B 19/02* (2006.01)
    *G05B 11/01* (2006.01)
    *B60L 1/00* (2006.01)
    *G06F 7/00* (2006.01)

(52) U.S. Cl. ................ 340/3.1; 340/693.1; 340/825.22; 307/10.1; 700/22; 701/36

(58) Field of Classification Search .................... 701/36; 713/300, 320, 324; 700/286, 22; 307/9.1, 307/10.7, 10.1; 340/693.1, 3.1, 501–506, 340/521–527, 825.22–825.25, 3.51
See application file for complete search history.

(56) References Cited

U.S. PATENT DOCUMENTS

| 4,943,997 | A | * | 7/1990 | Chang | 379/160 |
| 4,972,184 | A | * | 11/1990 | Go et al. | 340/825.25 |
| 5,493,498 | A | * | 2/1996 | Miyoshi | 701/208 |
| 5,625,350 | A | * | 4/1997 | Fukatsu et al. | 340/825.25 |
| 5,717,376 | A | * | 2/1998 | Wilson | 340/442 |
| 2005/0192723 | A1 | * | 9/2005 | Noguchi | 701/35 |
| 2005/0225173 | A1 | * | 10/2005 | Woltereck et al. | 307/10.1 |
| 2006/0126706 | A1 | * | 6/2006 | Brand et al. | 375/222 |

FOREIGN PATENT DOCUMENTS

| EP | 0 140 814 A2 | 5/1985 |
| EP | 0 515 042 A1 | 11/1992 |
| JP | A 2005-277711 | 10/2005 |

* cited by examiner

*Primary Examiner*—Benjamin C Lee
*Assistant Examiner*—Michael Shannon
(74) *Attorney, Agent, or Firm*—Oliff & Berridge, PLC

(57) ABSTRACT

An in vehicle device transfers connection information to a power management device, the connection information indicating whether the in-vehicle device can communicate with the power management device. The in-vehicle device either transfers condition information to the power management device, the condition information indicating that the in-vehicle device is ready for turning off, or sets the in-vehicle device to not communicate with the power management device when a predetermined condition is met, the predetermined condition indicative of an inability of the in-vehicle device to transfer information to the power management device. The power management device requests the connection information from the in-vehicle device and requests the condition information from the in-vehicle device. The power management device determines that the in-vehicle device is ready for turning off when both the connection information and the condition information have been received from the in-vehicle device, or no connection information has been received from the in-vehicle device because the in-vehicle device has been set to not communicate with the power management device.

11 Claims, 6 Drawing Sheets

POWER MANAGEMENT SYSTEMS, METHODS, AND PROGRAMS FOR IN-VEHICLE DEVICES

INCORPORATION BY REFERENCE

The disclosure of Japanese Patent Application No. 2006-006527 filed on Jan. 13, 2006, including the specification, drawings and abstract thereof, is incorporated herein by reference in its entirety.

BACKGROUND

1. Related Technical Fields

Related technical fields include power management systems, methods, and programs for in-vehicle devices.

2. Description of the Related Art

Various types of in-vehicle devices have been mounted on vehicles to make drivers and fellow passengers in the vehicle more comfortable. For example, radio receivers for receiving AM broadcast and FM broadcast, TV receivers for receiving telecast signals and displaying an image, audio devices for playing an MD and/or a CD, and/or navigation devices for providing driving guidance for the vehicle may be mounted on the vehicle as in-vehicle devices.

To transfer digital data such as digitized image data, audio data, or computer data among the various types of in-vehicle devices described above, large-capacity and high-speed communication is required. Therefore, the introduction of an in-vehicle network to transfer digital data even in a small space such as within the vehicle has been proposed. For example, the MOST (Media Oriented Systems Transport) system is an example of an in-vehicle network (for example, Japanese Unexamined Patent Application Publication No. 2005-277711). The MOST system has a cyclic network. Various in-vehicle devices such as a navigation device, an audio device, a radio receiver, and an AV amplifier are connected to each other via the network. As a result; for example, digital data output from the audio device is transferred to the AV amplifier through the network and the signal input by the AV amplifier is amplified and output to a speaker.

Further, the MOST system utilizes a network protocol using fiber optics. Importantly, systems such as the MOST system control the power of the entire system collectively instead of turning on/off the power supplied to each of the in-vehicle devices in the system. For example, each in-vehicle device and a power management unit for controlling the power of the system are connected to each other with an LAN or the MOST, and request data for turning on/off the power supplied to each of the in-vehicle devices is transferred from the power management unit, so that all of the connected in-vehicle devices may be turned on or off.

SUMMARY

According to the power management system using the power management unit described above, when a program reset repeatedly occurs in any one of the in-vehicle devices, the power management unit recognizes that a new in-vehicle device is connected to the power management unit every time the program reset occurs. As a result, for each recognized new connection, the power management system continuously provides registration processing for such a newly connected in-vehicle device. Typically, before the power management unit turns each of the in-vehicle devices off, the power management unit needs to receive responses that the connected in-vehicle devices are ready for turning off from the connected in-vehicle devices and needs to send request data to turn the in-vehicle devices off. However, when the series of resets occurs as described above, the reset in-vehicle device cannot send the response that the in-vehicle device is ready for turning off. Further, because registration processing for the in-vehicle device is repeatedly executed by the power management unit, the power management unit cannot send request data to turn the in-vehicle device off. As a result, the power of the entire system cannot reliably be turned off.

Various exemplary implementations of the broad principles described herein provide systems, methods, and programs for turning the power of the entire system off and preventing the battery of the vehicle from running out even when a series of program reset occurs by some sort of program factor or non-program factor.

Various exemplary implementations provide an in-vehicle device that may transfer connection information to a power management device, the connection information indicating whether the in-vehicle device can communicate with the power management device. The in-vehicle device may either transfer condition information to the power management device, the condition information indicating that the in-vehicle device is ready for turning off, or may set the in-vehicle device to not communicate with the power management device when a predetermined condition is met, the predetermined condition indicative of an inability of the in-vehicle device to transfer information to the power management device. The functions of the in-vehicle device may be implemented by a method or program.

Various exemplary implementations provide a power management device that may request the connection information from the in-vehicle device and may request the condition information from the in-vehicle device. The power management device may determine that the in-vehicle device is ready for turning off when both the connection information and the condition information have been received from the in-vehicle device. Alternatively, the power management device may determine that the in-vehicle device is ready for turning off when no connection information has been received from the in-vehicle device because the in-vehicle device has been set to not communicate with the power management device. The functions of the power management device may be implemented by a method or program.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
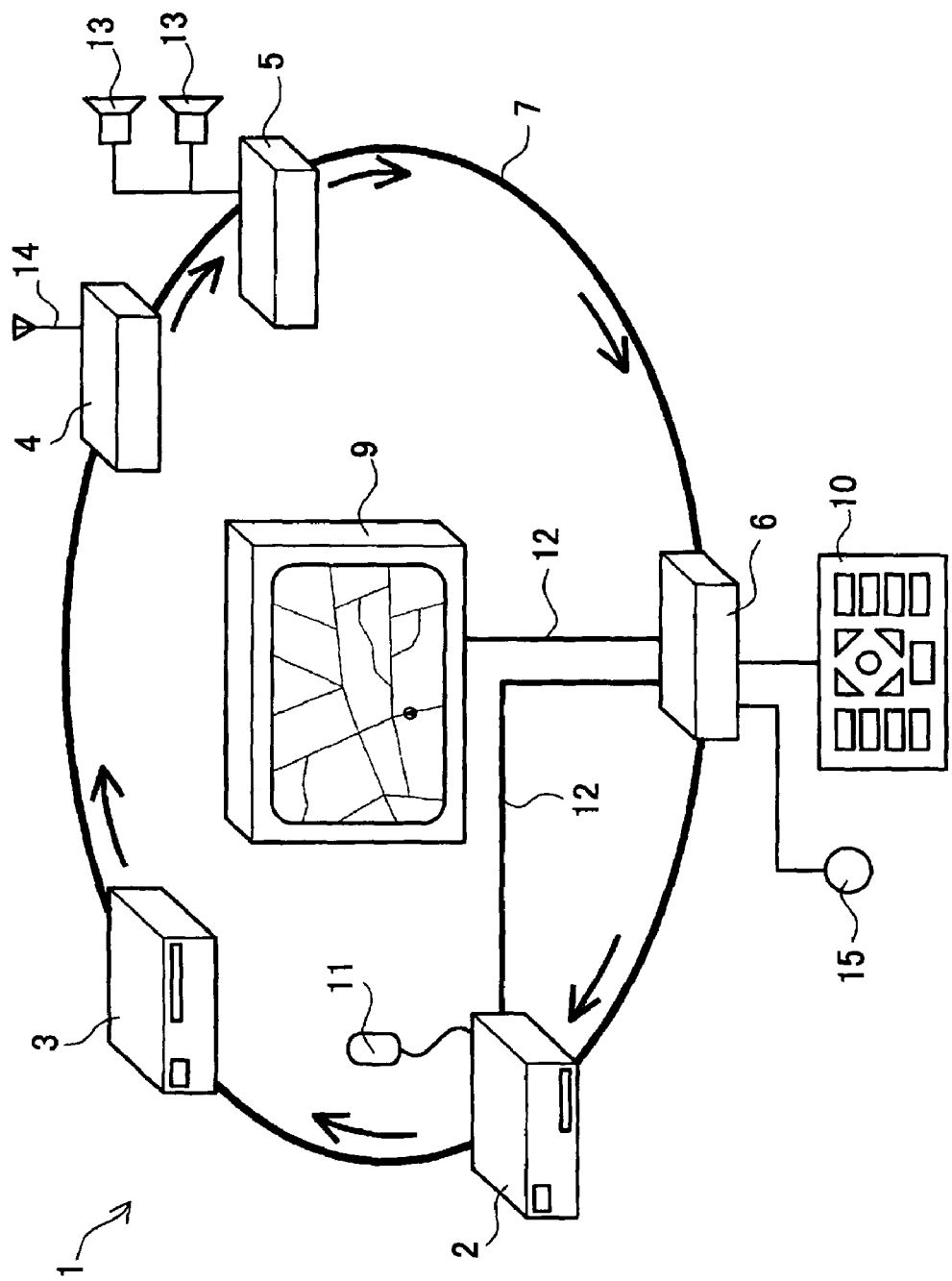
FIG. 1 is a structure outline of an exemplary power control system.

FIG. 1 is a diagram showing an exemplary structure of a power control system 1. As shown in FIG. 1, the power control system 1 may include an in-vehicle network including a navigation apparatus/device 2, a CD player 3, a radio tuner 4, and/or an AV amplifier 5 as in-vehicle devices mounted in a vehicle. The power control system 1 may also include a communication master device (power management device) 6 for communicating and controlling each of the in-vehicle apparatuses/devices 2-5. The power control system 1 may include a communication network 7 that circularly connects each of the in-vehicle devices 2-5 and the communication master device 6.

The communication network 7 may be, for example, a data communication network including, for example, the MOST system. The communication master device 6 may include a monitor device 9 for displaying images and an input device 10, which has a plurality of buttons, operated by a user.

The navigation device 2 may be an in-vehicle device for providing route guidance to a destination set by the user. A GPS 11 may be connected to the navigation device 2. The GPS 11 may receive position information according to a current vehicle position. The navigation device 2 may read out map information for the area surrounding the current vehicle position from a memory such as an internal CD, a DVD, or a hard disk drive on the basis of the received position information and may transfer image data (map data) to the monitor device 9 through a transmission line on the basis of the read out information, so that the map and the current vehicle position are displayed on the monitor device 9. The navigation device 2 may transfer audio data of the route guidance to the AV amplifier 5 through the communication network 7. The AV amplifier 5 may amplify the input signal and a speaker 13 to output an audio guidance.

The CD player 3 may be an audio device for playing a CD. The CD player 3 may read out digital data from the CD and may transfer the digital data to the AV amplifier 5 through the communication network 7. The AV amplifier 5 may amplify the input signal and the speaker 13 may output an audio message or music. The radio tuner 4 may be a receiver for receiving radio broadcasting. The radio tuner 4 may transfer a signal of an AM/FM broadcast received by an antenna 14 to the AV amplifier 5 through the communication network 7. The AV amplifier 5 may amplifies the input signal and the speaker 13 thereby output an audio message or music. The AV amplifier 5 may be an amplifier for amplifying an input audio signal and the speaker 13 may be connected to the AV amplifier 5. The AV amplifier 5 may amplify digital data input from the navigation device 2, the CD player 3, and/or the radio tuner 4 thereby output the digital data from the speaker 13.

The communication master device 6 may be a control device for communicating with each of the in-vehicle devices 2-5 via the communication network 7 and may control the in-vehicle devices 2-5. The monitor device 9 and/or the input device 10 may be connected to the communication master device 6. When the user operates the input device 10, the communication master device 6 may request each in-vehicle device 2-5 to start various programs on the basis of the operation by the user. The communication master device 6 may store image data in a memory, such as an internal storage device, and may display various types of images corresponding to one or more of the running in-vehicle devices (e.g., may not include the navigation device 2) on the monitor device 9. For example, a title of a song and/or the number of tracks may be displayed while the CD player 3 is running, and a frequency and/or a name of a radio station may be displayed while the radio tuner is running.

The communication master device 6 may control, for example, the power-on/off state of the in-vehicle devices 2-5. Specifically, a key switch 15 may be connected to the communication master device 6 for turning on/off a vehicle ignition or an ACC (accessory). When the ACC is on, the communication master device 6 may transfer a data signal over the communication network 7 and may request the in-vehicle devices 2-5 to turn on. When the ACC is off, the communication master device 6 may stop transferring the data signal over the communication network 7 and may request the in-vehicle devices 2-5 to turn off. Note that a gateway ECU (electronic control unit), as an interface for receiving a vehicle signal or a diagnosis such as a CAN, may be connected to the communication network 7 and the key switch 15 may be connected to the gateway ECU.

Figure 2:
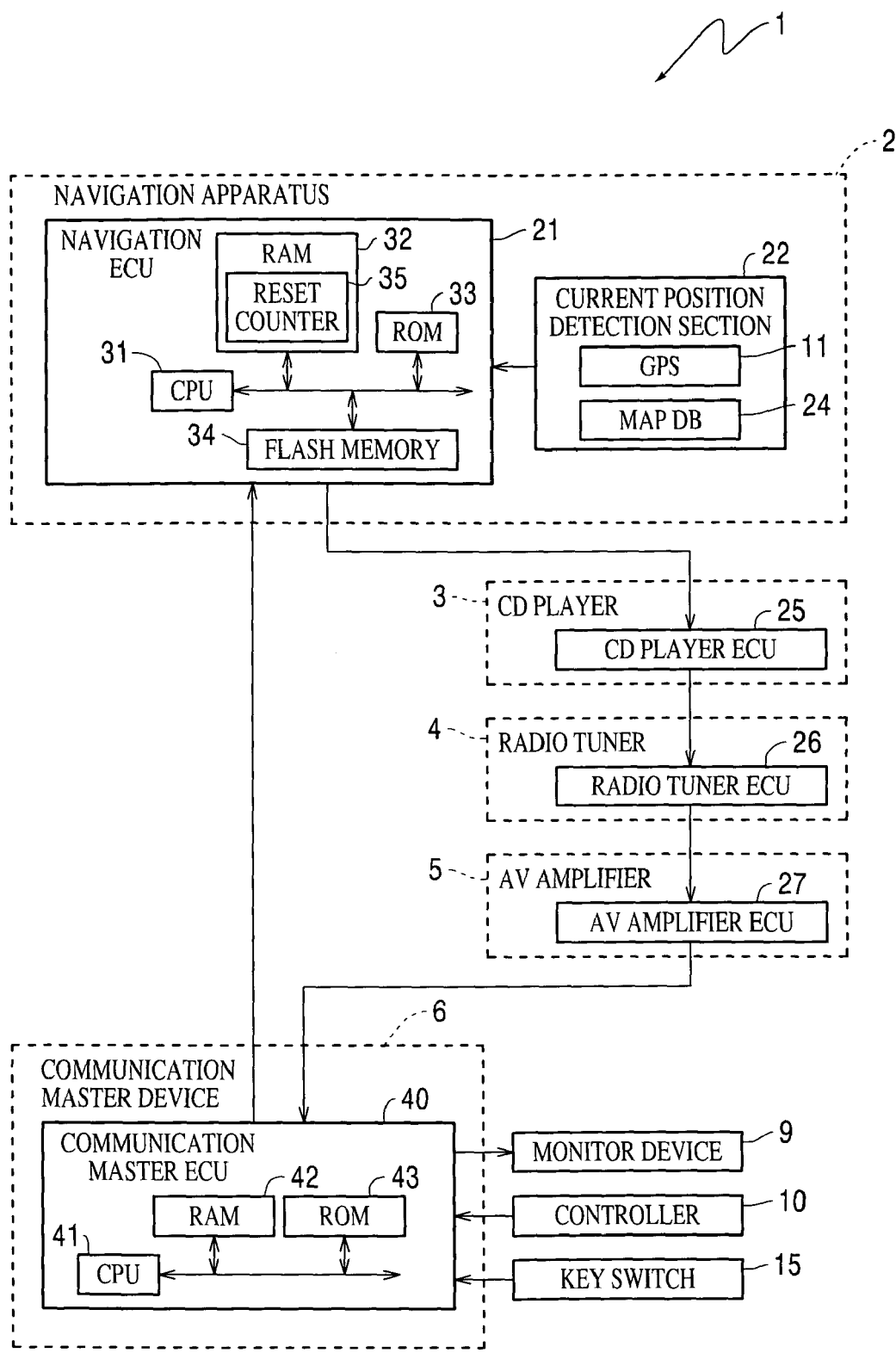
FIG. 2 is a block diagram showing control structures of an exemplary in-vehicle device and an exemplary communication device.

Next, control structures of the in-vehicle devices 2-5 and the communication master device 6 in the power control system 1 according to the first example will be described with reference to FIG. 2. FIG. 2 is a diagram showing exemplary control structures of the in-vehicle devices 2-5 and an exemplary communication master device 6 that may be used in the power control system 1.

As shown in FIG. 2, the navigation device 2 may include a navigation controller (ECU 21) and a current position detection section 22. The navigation ECU 21 may include a CPU 31 as a calculating device and a control device for controlling the entire navigation device 2. The navigation ECU 21 may include a memory such as a RAM 32, a ROM 33, and/or a flash memory 34. The RAM 32 may be used as a working memory when the CPU 31 executes various calculations. Route data for a searched route, information regarding a starting time of a series of program resets caused by a program factor or a non-program factor, and a reset counter 35 for counting the number of resets may be stored in the RAM 32.

The ROM 33 may store a control program, a series of reset processing programs (for example, implementing the method shown in FIG. 3) for setting an in-vehicle device not to respond to a communication from the communication master device 6 and for turning the in-vehicle device off when the series of resets occurs, and a power management control program (for example, implementing the method shown in FIG. 4) for controlling the power-on/off state of the in-vehicle devices on the basis of the communication provided by the communication master device 6. The flash memory 34 may store a program read out from the ROM 33. Note that, a semiconductor memory or a magnetic core may be used as the RAM 32, the ROM 33, or the flash memory 34. Further, an MPU may be used as the calculating device and the control device instead of the CPU 31.

Figure 3:
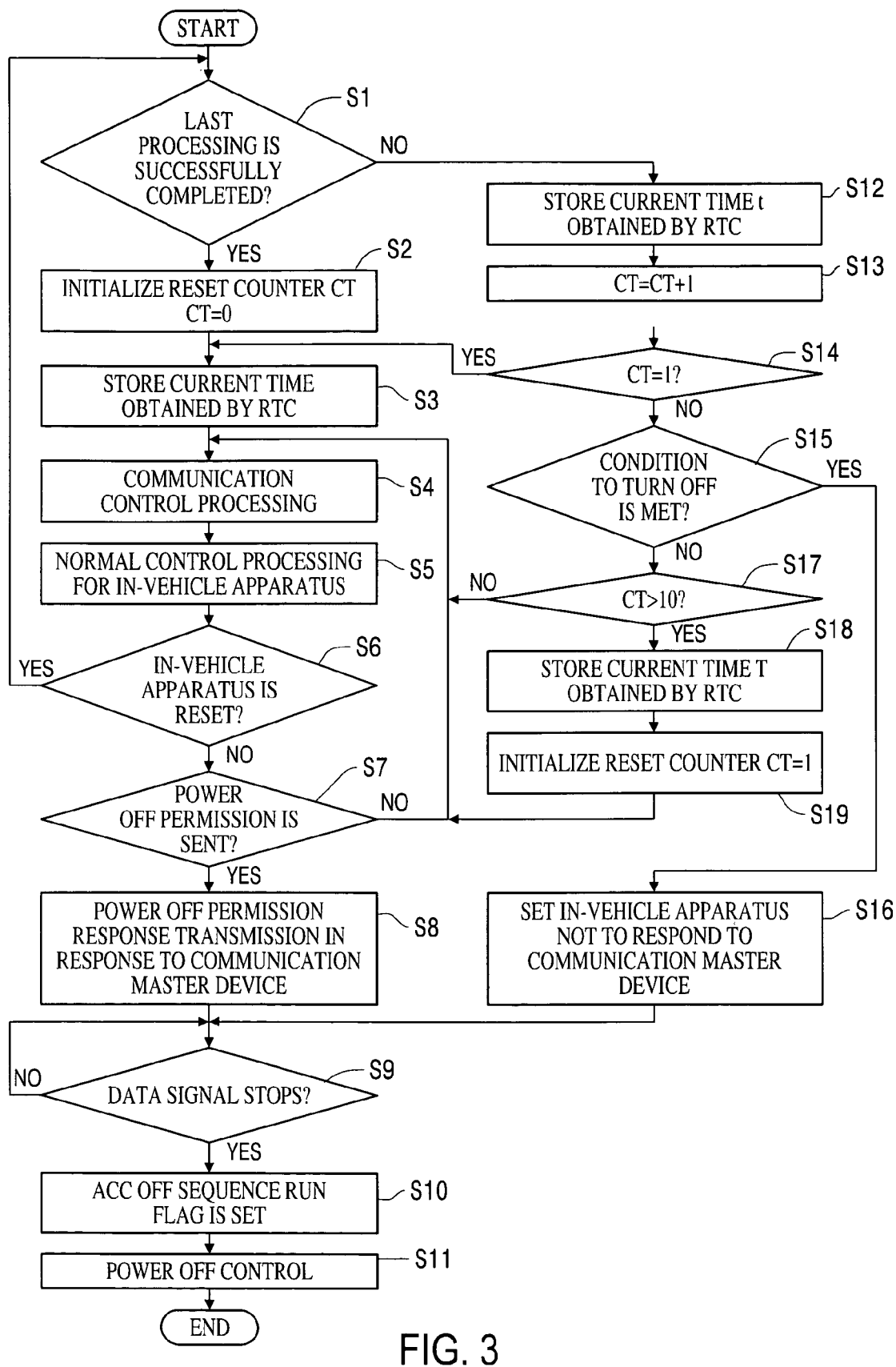
FIG. 3 is a flowchart showing an exemplary reset method.
Figure 4:
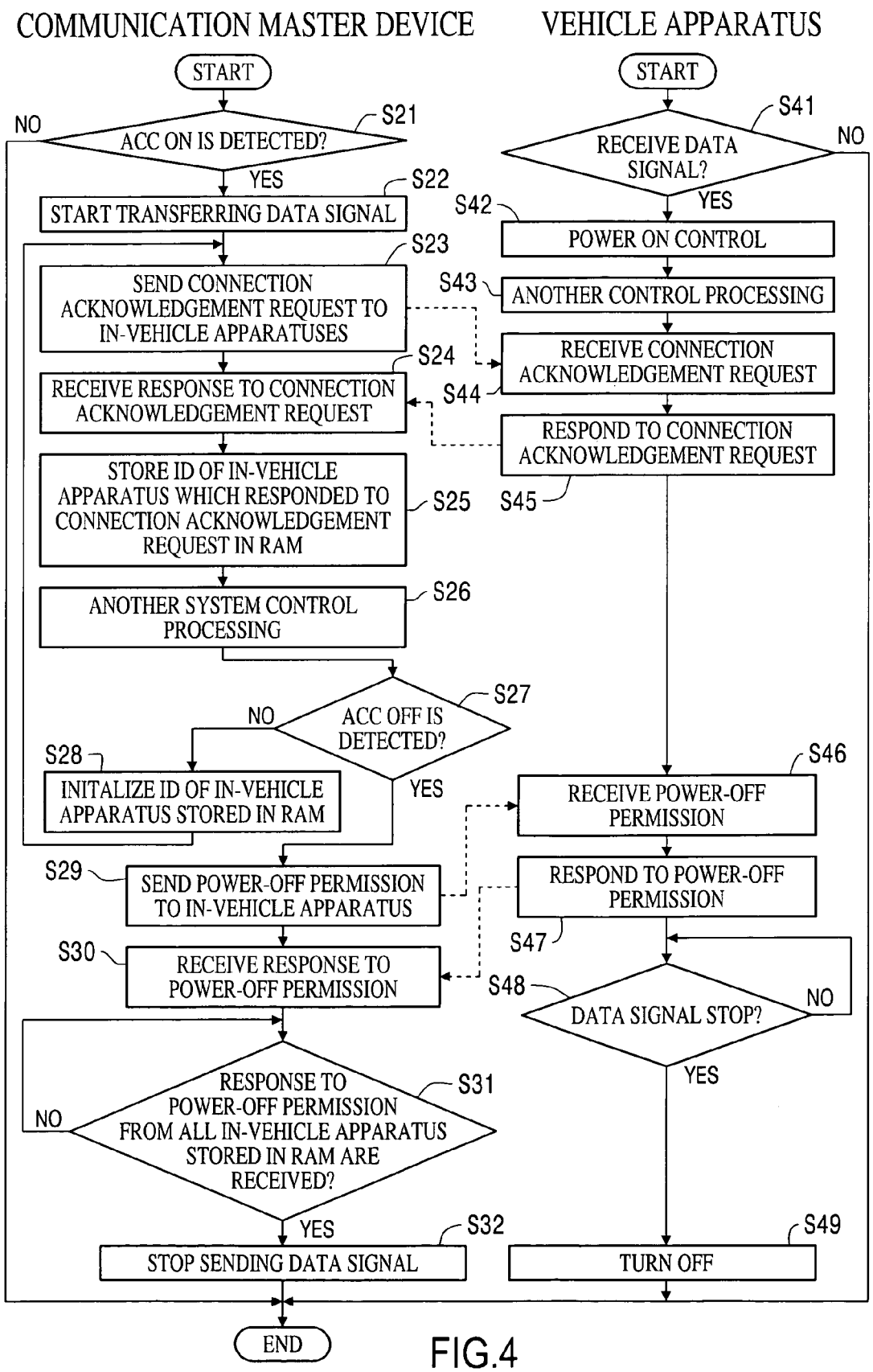
FIG. 4 is a flowchart showing an exemplary power management method.

When the communication master device 6 sends a data signal through the communication network 7 (for example, when it is ordered that the navigation device 2 should be turned on), the navigation ECU 21 may control the navigation device 2 to turn on (for example, implementing the method shown in FIG. 4). Meanwhile, when the communication master device 6 stops transferring the data signal (for example, when it is ordered that the navigation device 2 is turned off), the navigation ECU 21 may control the navigation device 2 to turn off. Further, when a series of program resets occurs a predetermined number of times (for example, equal to or more than 11 times) within a predetermined time period (for example, 60 seconds) due to a program factor or a non-program factor (for example, when a system reset occurs due to a hardware error when accessing software), the navigation ECU 21 may sets the in-vehicle device to not respond to the communication provided by the communication master device 6 and may controls the navigation device 2 to turn off (for example, implementing the method shown in FIG. 3).

The current position detection section 22 may include the GPS 11 for detecting a current vehicle position and a current time by receiving an electric wave provided by a satellite and a map database (DB) 24 for storing map data, so that it may be possible to specify the current vehicle position and the travel direction of the vehicle on the map.

Next, the control structure of the communication master device 6 will be described with reference to FIG. 2. The communication master device 6 may basically include a controller (communication master ECU 40) and various types of additional devices such as, for example, the monitor device 9, the input device 10, or the key switch 15 connected to the communication master ECU 40.

The communication master ECU 40 may include a CPU 41 as a calculating device and a control device for controlling the entire communication master device 6 and a memory such as an RAM 42, and/or an ROM 43. The RAM 42 may be used as a working memory when the CPU 41 executes various calculations. The RAM 42 may store IDs of in-vehicle devices, which respond to a connection acknowledgement request among the in-vehicle devices 2-5. The ROM 43 may store a control program and a power management control program (for example, implementing the method shown in FIG. 4) for controlling the power-on/off state of the in-vehicle devices by communicating with each of the in-vehicle devices connected to the communication network 7. Note that, a semiconductor memory or a magnetic core may be used as the RAM 42 or the ROM 43. Further, an MPU may be used as the calculating device and the control device instead of the CPU 41.

The communication master ECU 40 may send a connection acknowledgement request to each of the in-vehicle devices 2-5 via the communication network 7 and may store the IDs of the in-vehicle devices that respond to the connection acknowledgment request among the in-vehicle devices 2-5, so that the communication master ECU 40 may recognize which in-vehicle device is currently connected. Further, when the ACC is on, the communication master ECU 40 may start sending data signals over the communication network 7 and may request each of the in-vehicle devices 2-5 to turn on. When the ACC is off, the communication master ECU 40 may send a power-off permission to each of the in-vehicle devices 2-5 via the communication network 7. Then after all of the in-vehicle devices which are currently connected to the communication master ECU 40 respond to the permission, the communication master ECU 40 may stop sending data signals over the communication network 7 and requests each of the in-vehicle devices 2-5 to turn off (for example, implementing the method shown in FIG. 4).

The CD player 3 may include a controller (CD player ECU 25). The radio tuner 4 may include a controller (radio tuner ECU 26). The AV amplifier 5 may include a controller (AV amplifier controller ECU 27). Note that although the details of the CD player ECU 25, the radio tuner ECU 26, and the AV amplifier ECU 27 are not described here, each of the ECUs may include a CPU and an internal storage device such as an RAM, an ROM, and/or a flash memory as in the case of the navigation ECU 21. Further, the RAMs of these in-vehicle devices may store a storage range for storing a starting time of a series of program resets due to, for example, a program factor. A reset counter for counting the number of resets may be included in the RAMs. Further, in the ROMs, a series of reset processing programs (for example, implementing the method shown in FIG. 3) and a power management control program (for example, implementing the method shown in FIG. 4) described later may be stored as in the case of the navigation device.

Next, an exemplary reset method will be described with reference to FIG. 3. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure. For example, the method may be stored in the form of a program in the ROMs and/or the RAMs of the ECUs 21 and 25-27 and may be executed by each of the CPUs of the ECUs 21 and 25-27 after the in-vehicle devices corresponding to the ECUs are turned on.

The method may be embodied as a program for setting the in-vehicle devices not to respond to the communication provided by the communication master device 6 and for turning the in-vehicle devices off when the series of program reset occurs due to a program factor or a non-program factor (for example, when a system reset occurs due to a hardware error when just accessing a software).

As shown in FIG. 3, it is determined whether the method is properly terminated without resetting in Step 1 (hereinafter referred to as S1). Specifically, when an ACC off sequence run flag is set on a procedure in S10 and when the power is properly turned off, it is determined that the method is properly terminated.

When it is determined that the method is properly terminated (S1=YES), the reset counter in the RAM is initialized and the counter value (CT) is set as "0" (S2).

In S3, a current time T obtained by an RTC (Real Time Clock) is stored, for example, by the CPU in the RAM. Note that, the current time T stored in the RAM in S3 may be used in S15 as a starting time of a series of resets while it is determined whether a condition for turning off is met or not. In S4, a communication control processing for responding to a connection acknowledgment request provided by the communication master device 6 or for receiving a request to start various types of control program is executed.

In S5, the standard control processing for in-vehicle devices corresponding to communication control processing in S4 is executed. Specifically, for example, the navigation device 2 may execute a destination setting processing, a route search processing, and/or a guidance processing along the route on the basis of the instruction from the communication master device 6. Alternatively, for example, the CD player 3 may play a CD, pause the CD, and/or fast-forward the CD on the basis of the instruction from the communication master device 6.

In S6, it is determined whether the method is reset due to a program factor or a non-program factor (for example, when a system reset occurs due to a hardware error when accessing software). When it is determined that the method is reset (S6=YES), the procedure returns to S1. When it is determined that the method is not reset (S6=NO), the procedure goes to S7.

In S7, it is determined whether the power-off permission sent from the communication master device 6 is received. When it is determined that the power-off permission is not received (S7=NO), the procedure returns to S4 and various control processing is again executed. When it is determined that the power-off permission is received (S7=YES), a response to the power-off permission is sent to the communication master device 6 and the communication master device 6 is informed of the device being ready for turning off (S8).

In S9, it is determined whether data signal transfer on the communication network 7 is terminated, that is, whether the communication master device 6 requests for turning the in-vehicle device off. When it is determined that data signal transfer is not terminated (S9=NO), the method does not progress until the data signal transfer is terminated. When it is determined that data signal transfer is terminated (S9=YES), the method goes to S10.

In S10, the ACC off sequence run flag is set on the basis of the completion of the program. In S11, the CPU turns off the in-vehicle device.

When it is determined that the program is not successfully terminated in S1 (S1=NO), that is, it is determined that the program is reset and crashed, the current time t obtained by the RTC is stored in the RAM (S12). Note that, the current time t stored in the RAM in S12 is used as a starting time of last reset while it is determined whether the power-off condition is met in S15. In S13, "1" is added for the reset counter value (CT) in the RAM.

In S14, it is determined whether the count of the reset counter (CT) in the RAM is 1, that is, whether the first program reset occurs after the program is terminated. When it is determined that the count of the reset counter (CT) in the RAM is 1 (S14=YES), the procedure returns to S3 to store the starting time T of the series of resets.

When it is determined that the count of the reset counter (CT) in the RAM is other than 1 (S14=NO), it is further determined whether the power-off condition is met (S15). The power-off condition here means a condition to determine whether a response to the power-off permission can be sent to the communication master device 6. Specifically, the condition may be that the series of program resets occurs a predetermined number of times (for example, equal to or more than 11 times) within a predetermined time period (for example, 60 seconds). Then, when "t<T+60 sec" is true according to the starting time T of the series of resets stored in S3 or S18 and the starting time t of the last reset stored in S12, and when the count of the reset counter (CT) is greater than 10 (CT>10), it is determined that the power-off condition is met.

When it is determined that the power-off condition is met (S15=YES), the in-vehicle device is set not to respond to the communication provided by the communication master device 6 (S16) and the procedures goes to S9. Note that, the in-vehicle device set not to respond to the communication provided by the communication master device 6 in S9 is not recognized by the communication master device 6 as an in-vehicle device connected to the communication network 7 (S25 in FIG. 4), so that even if any one of the in-vehicle devices is repeatedly reset, the communication master device 6 stops transferring a data signal and requests the entire power control system 1 to turn off.

When it is determined that the power-off condition is not met (S15=NO), it is further determined whether the count of the reset counter CT is greater than 10 (CT>10), that is, whether it takes equal to or more than 60 seconds for the in-vehicle device to be repeatedly reset equal to or more than 11 times (S17).

As a result, when it is determined that the count of the reset counter CT is greater than 10 (CT>10) (S17=YES), the CPU stores the current time T obtained by the RTC to re-count the number of the series of resets (S18). In S19, the CPU initializes the count of the reset counter (CT) in the RAM and set the count as "1" (S19). Then the procedure goes to S4. Note that, the current time T stored in the RAM in S18 is used as a starting time of the series of resets while it is determined whether the power-off condition is met in S15.

When it is determined that the count of the reset counter (CT) is equal to or less than 10 (CT>10) (S17=NO), that is, that the number of the reset during the series of resets is less than 11 times since the number of times starts being counted, the procedures goes to S4 and the number of reset is ongoingly counted.

Next, an exemplary power management method will be described with reference to FIG. 4. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

For example, the method my be embodied as a program stored in the ROM and/or the RAM of each of the ECUs 21, 25-27, and 40 and executed by the communication master ECU 40 of the communication master device 6 and the ECUs 21 and 25-27 of the in-vehicle devices.

The first portion of the method, which, for example, may be executed by the CPU 41 will be described. First, in S21, the CPU 41 determines whether the key switch 15 (ACC) is turned on. When it is determined that the ACC is not on (S21=NO), the power management processing method is terminated. When it is determined that the ACC is on (S21=YES), the CPU 41 starts transferring a data signal over the communication network 7 for turning on the power of the in-vehicle device in S22. In S23, the CPU 41 transfers a connection acknowledgement request to each of the in-vehicle devices 2-5 connected through the communication network 7.

In S24, the CPU 41 receives responses to the connection acknowledgment request (sent in S23) from the in-vehicle devices. In S25, IDs of in-vehicle devices, which responded to the connection acknowledgment request among all of the in-vehicle devices, are stored in the RAM 42. Therefore, it may be specified which in-vehicle device is currently connected to the communication master device 6. Then the CPU 41 executes system communication processing such as a request for starting a control program for each of the connected in-vehicle devices in S26.

In S27, the CPU 41 determines whether the key switch 15 (ACC) is turned off. When it is determined that the ACC is not off (S27=NO), the IDs of the in-vehicle devices stored in the RAM 42 in S25 are initialized (S28), and the procedure returns to S23. Then the connection acknowledgment request is again transferred and the IDs of only in-vehicle devices that respond to the request are stored.

As described above, the ECUs 21 and 25-27 of the in-vehicle devices are set not to respond to the communication provided by the communication master device 6 when the series of program resets occurs a predetermined number of times within a predetermined time period (S16 in FIG. 3). As a result, the in-vehicle devices which are set not to respond to the communication provided by the communication master device 6 do not respond to the connection acknowledgement request, so that, in S25, the CPU 41 does not recognize such in-vehicle devices as the in-vehicle devices connected to the communication master device 6 (that is, the CPU 41 assumes that such in-vehicle devices do not exist).

Figure 5A:
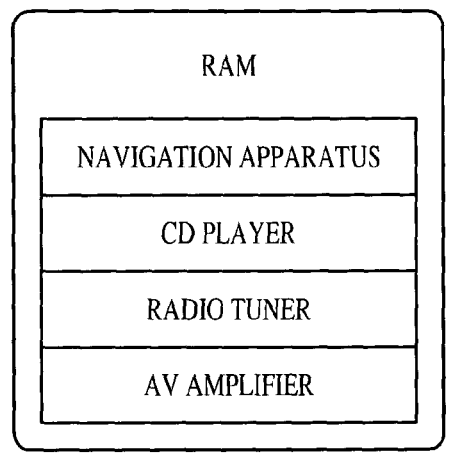
FIGS. 5A and 5B are diagrams showing exemplary recognition processing.
Figure 5B:
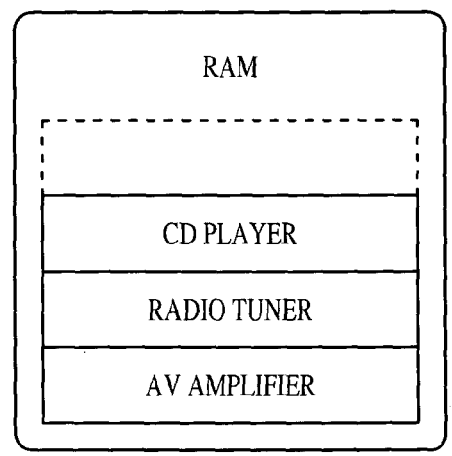

The recognition processing of the in-vehicle devices that are connected to the communication master device 6 is exemplified in FIGS. 5A and 5B. When, for example, the navigation device 2, the CD player 3, the radio tuner 4, and the AV amplifier 5 respond to the connection acknowledgment request, the IDs of the in-vehicle devices 2-5 are stored in the RAM 42 as shown in S25 in FIG. 5A. The CPU 41 recognizes that the navigation device 2, the CD player 3, the radio tuner 4, and the AV amplifier 5 are connected to the communication master device 6. When, for example, the navigation device 2 is repeatedly reset and is set not to respond to the communication provided by the communication master device 6 (S16 in FIG. 3), the navigation device 2 will not respond to the connection acknowledgement request. As a result, in S25, only the IDs of the CD player 3, the radio tuner 4, and the AV amplifier 5 are stored in the RAM 42 as shown in FIG. B. Thus, the CPU 41 recognizes that only the CD player 3, the radio tuner 4, and the AV amplifier 5 are connected to the communication master device 6.

When it is determined that the ACC is off in S27 (S27=YES), the CPU 41 sends the power-off permission to each of the in-vehicle devices connected through the communication network 7 for determining whether the in-vehicle devices are ready for turning off (S29).

In S30, the CPU 41 receives responses to the power-off permission (sent from each of the in-vehicle devices in S29). In S31, it is determined whether all expected responses to the power-off permission are received from all in-vehicle devices, which responded to the connection acknowledgement request in S25. For example, when only the IDs of the CD player 3, the radio tuner 4, and the AV amplifier 5 are stored in the RAM 42, the CPU 41 determines whether the responses to the power-off permission from the CD player 3, the radio tuner 4, and the AV amplifier 5 are received.

When it is determined that the responses to the power-off permission from all of the in-vehicle devices which responded to the connection acknowledgement request are not received (S31=NO), the CPU 41 waits until receiving all responses to the power-off permission. When it is determined that the all expected responses to the power-off permission from the in-vehicle devices which responded to the connection acknowledgement request are received (S31=YES), the CPU 41 stops transferring the data signal over the communication network 7 to turn the in-vehicle devices off (S32). As a result, the in-vehicle devices connected to the communication network 7 are turned off.

Next, the portions of the method that, for example, may be executed by the CPUs of the in-vehicle devices 2-5 connected to the communication master device 6 will be described.

In S41, the CPU determines whether the data signal sent from the communication master device 6 is received. When it is determined that the data signal is received (S41=YES), the in-vehicle device is turned on (S42). When it is determined that the data signal is not received (S41=NO), the power management processing method is terminated.

Another control processing is executed for the in-vehicle device in S43. Specifically, for example, according to the navigation device 2, a destination setting processing, a route search processing, and/or a route guidance processing along the set route may be executed on the basis of the request from the communication master device 6. According to the CD player 3, a CD playing processing, a pausing processing, and/or a fast-forwarding processing may be executed on the basis of the request from the communication master device 6.

In S44, the connection acknowledgement request sent from the communication master device 6 is received. In S45, the response to the connection acknowledgement request is sent to the communication master device 6, so that the communication master device 6 may specify which in-vehicle device is currently connected to the communication master device 6.

In S46, the power-off permission sent from the communication master device 6 is received. In S47, the response to the power-off permission is sent to the communication master device 6, so that the communication master device 6 may determine whether the currently connected in-vehicle device is ready for turning off.

In S48, the CPU determines whether the data signal is no longer transferred from the communication master device 6. When it is determined that the data signal is no longer transferred (S48=YES), the corresponding in-vehicle device is turned off (S49). When it is determined that the data signal is still transferred, (S48=NO), the CPU waits until the transfer of the data signal stops.

As described in detail above, according to the power control system 1, when it is determined that any one of the in-vehicle devices (the navigation device 2, the CD player 3, the radio tuner 4, and the AV amplifier 5) connected to the communication master device 6 is repeatedly reset and that the corresponding program is reset a predetermined number of times (for example, equal to or more than 11 times) within a predetermined time period (for example, 60 seconds) (S15=YES), the in-vehicle device is set not to respond to the communication provided by the communication master device 6 (S16). Meanwhile, when the communication master device 6 recognizes in-vehicle devices which responded to the connection acknowledgement request as currently connected in-vehicle devices (S25) and when it is determined that all expected responses to the power-off permission from all of the currently connected in-vehicle devices are received (S31=YES), the communication master device 6 requests the in-vehicle devices to turn off (S32).

Therefore, even if a series of program resets occurs by some sort of program factor or non-program factor (for example, when a system reset occurs due to a hardware error when accessing software. e.g., a crash) and there is an in-vehicle device which does not send condition information indicating that the in-vehicle device is ready for turning off to the power management device, the power management system ignores the existence of such in-vehicle device. As a result, the power of the entire system may be turned off in spite of the system reset. As a result, the in-vehicle devices will not remain on after the vehicle engine stops, thereby conserving the power of the vehicle's battery.

Another exemplary power management method will be described with reference to FIG. 6. Again, the exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

Figure 6:
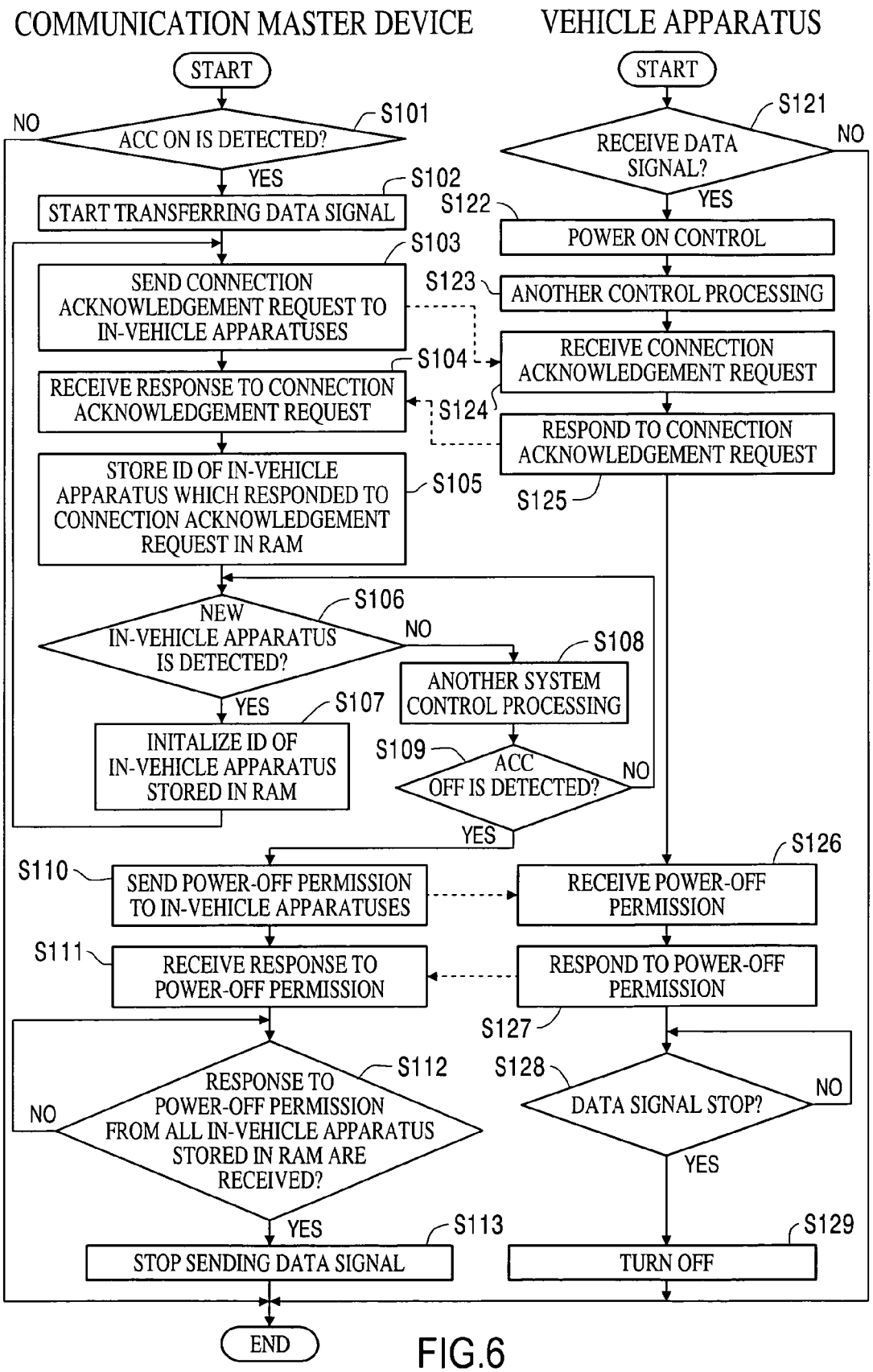
FIG. 6 is a flowchart showing an exemplary power management method.

There may be a difference between the power control system 1 and the power control system that may execute the method of FIG. 6. The power control system that may execute the method of FIG. 6, may initialize IDs of in-vehicle devices stored in the RAM 42 of the communication master device 6 only when it is determined that a new in-vehicle device is connected and re-recognizes which in-vehicle device is connected to the communication master device 6.

The method of FIG. 6 may be implemented by a program stored in the ROM and/or the RAM of the ECUs 21, 25-27, and 40 and may be repeatedly executed by the CPUs in certain intervals.

The first portion of the method, which, for example, may be executed by the CPU 41 will be described. First, in S101, the CPU 41 determines whether the key switch 15 is turned ACC on. When it is determined that the ACC is not on (S101=NO), the power management processing method is terminated.

When it is determined that the ACC is on (S101=YES), the CPU 41 starts transferring a data signal over the communication network 7 to request the in-vehicle devices to turn on in S102. In S103, the CPU 41 sends the connection acknowledgement request to each of the in-vehicle devices (for example, the navigation device 2, the CD player 3, the radio tuner 4, and the AV amplifier 5) connected through the communication network 7.

In S104, the CPU 41 receives responses to the request in S103 sent from the in-vehicle devices. In S105, the IDs of the in-vehicle devices which responded to the request among all of the in-vehicle devices are stored in the RAM 42, so that it may be specified which in-vehicle device is currently connected to the communication master device 6.

In S106, the CPU 41 determines whether any in-vehicle device, which is newly connected to the communication network 7, is detected. When the program reset occurs according to the in-vehicle device connected to the communication network 7, the response to the connection acknowledgement request is sent to the communication master device 6 again to inform the connection of the in-vehicle device. Therefore, when the program of any one of the in-vehicle devices 2-5 connected to the communication master device 6 is reset, the communication master device 6 detects the new connection of the in-vehicle device.

When it is determined that the connection of the new in-vehicle device is detected (S106=YES), the IDs of the in-vehicle devices stored in the RAM 42 in S105 are initialized (S107), and the procedure returns to S103. The connection acknowledgement request is again sent and the IDs of the in-vehicle devices, which responded to the request, are registered.

When it is determined that the connection of the new in-vehicle device is not detected (S106=NO), a system communication processing such as a request for starting control programs for the connected in-vehicle devices is executed (S108).

In S109, the CPU 41 determines whether the key switch 15 is turned ACC off. When the ACC is not off (S109=NO), the procedure returns to the determination processing in S106 and it is further determined whether there is any in-vehicle device which is newly connected.

When it is determined that the ACC is off (S109=YES), the power-off permission is sent to each of the in-vehicle devices (for example, the navigation device 2, the CD player 3, the radio tuner 4, and the AV amplifier 5) connected through the communication network 7 for determining whether such in-vehicle devices are ready for turning off (S110).

In S111, the CPU 41 receives the responses to the power-off permission in S110 sent from each of the in-vehicle devices. In S112, it is determined whether all expected responses to the power-off permission from all of the in-vehicle devices, which responded to the connection acknowledgement request in S105, are received. For example, when the IDs of the CD player 3, the radio tuner 4, and the AV amplifier 5 other than the navigation device 2 are stored in the RAM 42, the CPU 41 determines whether the responses to the power-off permissions from the CD player 3, the radio tuner 4, and the AV amplifier 5 are received.

When it is determined that all expected responses to the power-off permission from all of the in-vehicle devices which responded to the connection acknowledgement request are not received (S112=NO), the CPU 41 waits until all expected responses are received. When it is determined that all responses to the power-off permission from all of the in-vehicle devices which responded to the connection acknowledgement request are received (S112=YES), the data signal transfer over the communication network 7 stops to make the in-vehicle devices turn off (S113), so that the in-vehicle devices connected to the communication network 7 are controlled to turn off.

Note that, processing described in S121-S129, for example, executed by the CPUs of the in-vehicle devices 2-5 connected to the communication master device 6 according to the power management processing program is same as the processing described in S41-S49 executed by the CPUs of the in-vehicle devices 2-5 according to the power management method of FIG. 4. Thus, a detail description thereof is not repeated.

As described above, when it is determined that any one of the in-vehicle devices 2-5 connected to the communication master device 6 is repeatedly reset and that the program of the in-vehicle device is reset a predetermined number of times (for example, equal to or more than 11 times) within a predetermined time period (for example, 60 seconds), the in-vehicle device may be set not to respond to the communication provided by the communication master device 6. When the communication master device 6 recognizes only in-vehicle devices which responded to the connection acknowledgement request as the currently connected in-vehicle devices (S105) and when it is determined that all expected responses to the power-off permission from the connected in-vehicle devices are received (S112=YES), the communication master device 6 requests the in-vehicle devices to turn of (S113). Therefore, even if a series of program resets occurs by some sort of program factor or non-program factor (for example, when a system reset occurs due to a hardware error when accessing software) and there is an in-vehicle device which does not send condition information indicating that the in-vehicle device is ready for turning off to the power management device, the power management system ignores the existence of such in-vehicle device. Thus, the power of the entire system may be turned off. As a result, the power-on state of the in-vehicle devices may not continue after the vehicle engine stops and it may conserve the power of the vehicle's battery.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, according to the first and the second examples, the navigation device 2, the CD player 3, the radio tuner 4, and the AV amplifier 5 are described as the in-vehicle devices mounted in the vehicle. However, such in-vehicle devices used in the power control system 1 are not limited to the particular devices described above. For example, an MD player, a DVD player, an ETC device, or any other device requiring power may be used.

Further, according to the above examples, the power-off condition to not respond to the communication provided by the communication master device 6 is when the in-vehicle device is reset a predetermined number of times within a predetermined time period. However, if it is possible to determine that the in-vehicle devices cannot respond to the power-off permission to the communication master device 6 based on other conditions. For example, the condition may be only that the program is reset a predetermined number of times.

Further, according to the above examples, the system in which the communication master device 6 and the in-vehicle devices 2-5 are connected to each other through the MOST is described as an example of the power control system for in-vehicle devices. However, any system in which the communication master device 6 and the in-vehicle devices 2-5 are connected to each other may be used. For example, a system in which the communication master device 6 and the in-vehicle devices 2-5 are connected to each other through the LAN may be used. Further, as a communication method, an optical communication with the fiber, an electric communication with an electric signal, or a radio communication may be used.

What is claimed is:

1. A power management system, comprising:
an in-vehicle device including an in-vehicle device controller that:
  transfers connection information to a power management device, the connection information indicating whether the in-vehicle device can communicate with the power management device; and
  transfers condition information to the power management device, the condition information indicating that the in-vehicle device is ready for turning off; or
  sets the in-vehicle device to not communicate with the power management device when a predetermined condition is met, the predetermined condition indicative of an inability of the in-vehicle device to transfer information to the power management device; and
the power management device including a power management controller that:
  requests the connection information from the in-vehicle device;
  requests the condition information from the in-vehicle device; and
  determines that the in-vehicle device is ready for turning off when:
    both the connection information and the condition information have been received from the in-vehicle device; or
    no connection information has been received from the in-vehicle device because the in-vehicle device has been set to not communicate with the power management device.

2. The power management system of claim 1, wherein:
either the in-vehicle device controller or the power management controller:
  counts a number of program resets executed by the in-vehicle device; and
  determines whether a predetermined number of program resets occurs during a predetermined time period; and
the predetermined condition is met when the predetermined number of program resets occurs during the predetermined time period.

3. The power management system of claim 1, wherein:
the power management device further comprises a memory; and
when the power management device receives the connection information from the in-vehicle device, an ID of the in-vehicle device is stored in the memory indicating that the in-vehicle device has an ability to transfer information to the power management device.

4. The power management system of claim 1, wherein the power management controller periodically requests the connection information from the in-vehicle device.

5. The power management system of claim 1, wherein the power management controller:
detects a power-on state of the in-vehicle device; and
when the power-on state is detected, requests the connection information from the in-vehicle device.

6. A power management method, comprising:
requesting connection information from an in-vehicle device, the connection information indicating whether the in-vehicle device can communicate with a power management device;
determining whether a predetermined condition is met, the predetermined condition indicative of an inability of the in-vehicle device to communicate with the power management device; and
if the in-vehicle device can communicate with the power management device, transferring connection information to the power management device;
requesting condition information from the in-vehicle device, the condition information indicating that the in-vehicle device is ready for turning off;
determining that the in-vehicle device is ready for turning off when:
  both the connection information and the condition information have been received from the in-vehicle device; or
  no connection information has been received from the in-vehicle device because the predetermined condition is met.

7. The power management method of claim 6, further comprising:
counting a number of program resets executed by the in-vehicle device;
determining whether a predetermined number of program resets occurs during a predetermined time period; and
determining that the predetermined condition is met when the predetermined number of program resets occurs during the predetermined time period.

8. The power management method of claim 6, further comprising:
storing an ID of the in-vehicle device in a memory when the power management device receives the connection information from the in-vehicle device, the stored ID indicating that the in-vehicle device has an ability to transfer information to the power management device.

9. The power management method of claim 6, further comprising periodically requesting the connection information from the in-vehicle device.

10. The power management method of claim 6, further comprising:
detecting a power-on-state of the in-vehicle device; and
when the power-on-state is detected, requesting the connection information from the in-vehicle device.

11. One or more storage mediums storing a set of program instructions executable by one or more data processing devices, the instructions usable to implement the method of claim 6.

* * * * *